United States Patent
Hagin et al.

(10) Patent No.: US 11,631,956 B2
(45) Date of Patent: Apr. 18, 2023

(54) FASTENING DEVICE FOR A CONDUCTOR LINE AND CONDUCTOR LINE SYSTEM

(71) Applicant: Conductix-Wampfler GmbH, Weil am Rhein (DE)

(72) Inventors: Moritz Hagin, Weil am Rhein (DE); Dietmar Lang, Schliengen (DE)

(73) Assignee: Conductix-Wampfler GmbH, Weil am Rhein (DE)

( * ) Notice: Subject to any disclaimer, the term of this patent is extended or adjusted under 35 U.S.C. 154(b) by 817 days.

(21) Appl. No.: 16/481,987

(22) PCT Filed: Feb. 27, 2018

(86) PCT No.: PCT/EP2018/054790
§ 371 (c)(1),
(2) Date: Jul. 30, 2019

(87) PCT Pub. No.: WO2018/219506
PCT Pub. Date: Dec. 6, 2018

(65) Prior Publication Data
US 2019/0393658 A1    Dec. 26, 2019

(30) Foreign Application Priority Data
May 31, 2017   (DE) .................... 10 2017 111 984.1

(51) Int. Cl.
*H01R 25/14*  (2006.01)
*H02G 5/04*   (2006.01)

(52) U.S. Cl.
CPC .............. *H01R 25/14* (2013.01); *H02G 5/04* (2013.01)

(58) Field of Classification Search
CPC ........ H01R 25/14; H01R 4/64; H01R 25/142; H02G 5/04; B60M 1/36; B60M 1/307
See application file for complete search history.

(56) References Cited

U.S. PATENT DOCUMENTS

| | | | | |
|---|---|---|---|---|
| 3,832,503 A | * | 8/1974 | Crane | F21V 21/35 200/51.07 |
| 6,716,042 B2 | * | 4/2004 | Lin | F21V 21/35 362/147 |

(Continued)

FOREIGN PATENT DOCUMENTS

| | | |
|---|---|---|
| DE | 2246681 A1 | 3/1974 |
| DE | 2246681 B1 | 3/1974 |

(Continued)

OTHER PUBLICATIONS

International Preliminary Report on Patentability dated Dec. 3, 2019 with Written Opinion for PCT/EP2018/054790 filed Feb. 27, 2018 (English translation).

(Continued)

*Primary Examiner* — Travis S Chambers
(74) *Attorney, Agent, or Firm* — Paul D. Bianco; Gary S. Winer; Fleit Intellectual Property Law

(57) ABSTRACT

A fastening device for fastening a conductor line to at least one mounting element. The fastening device has at least one holding element connectable to the conductor line. The holding element fastens the conductor line to the mounting element such that movement perpendicular to the longitudinal direction of the conductor line is not possible. A conductor line system has a conductor line, which is fastened by a first fastening device to a first mounting element and by a second fastening device spaced apart therefrom to a second mounting element. The first fastening device is connected to the conductor line and to the first mounting element in such a way that movement in the longitudinal direction is not possible. The second fastening device is (Continued)

connected to the conductor line and/or to the mounting line in such a way that movement in the longitudinal direction is possible.

11 Claims, 4 Drawing Sheets

(56) References Cited

U.S. PATENT DOCUMENTS

| | | | | |
|---|---|---|---|---|
| 7,455,535 | B2* | 11/2008 | Insalaco | H01R 25/142 |
| | | | | 439/121 |
| 7,507,005 | B1* | 3/2009 | Mier-Langner | F21V 21/35 |
| | | | | 439/111 |
| RE45,456 | E* | 4/2015 | Sinclair | H01R 25/142 |
| | | | | 439/111 |
| 2007/0153550 | A1* | 7/2007 | Lehman | H01R 25/147 |
| | | | | 362/648 |

FOREIGN PATENT DOCUMENTS

| | | |
|---|---|---|
| DE | 3440776 A1 | 5/1986 |
| JP | S5618225 U | 2/1981 |
| JP | S5757129 U | 4/1982 |
| JP | 2016041552 A | 3/2016 |
| WO | 2016/023705 A1 | 2/2016 |

OTHER PUBLICATIONS

Brochure—Safety Conductor Lines KBSL and KSL of Fa. Paul Vahle GmbH & Co. KG (6 pages) 2008.
2015, XP055477314, Retrieved from the Internet: URL:http://www.conductix.nl/sites/default/files/downloads/KAT0835-0001-E_Conductor_Rsil_Systems_for_Shuttles_MultiLine_Program_0835.pdf [retrieved on May 22, 2018] (16 pages).
International Search Report dated May 23, 2018 for PCT/EP2018/054790, filed Feb. 27, 2018.
Written Opinion for PCT/EP2018/054790, filed Feb. 27, 2018.
Result of examination report for German Patent Application No. 10 2017 111 984.1, filed May 31, 2017.
Examination Report dated Feb. 7, 2020 for European Patent Application No. 18 708 387.8 (6 pages).
Examination Report dated Jan. 19, 2021 for European Patent Application No. 18 708 387.8 (7 pages).
Office Action dated Sep. 24, 2021 for Chinese Application No. 201880003618.X, 14 pages.
Office Action dated May 13, 2022 for Chinese Application No. 201880003618.X , 12 pages.

* cited by examiner

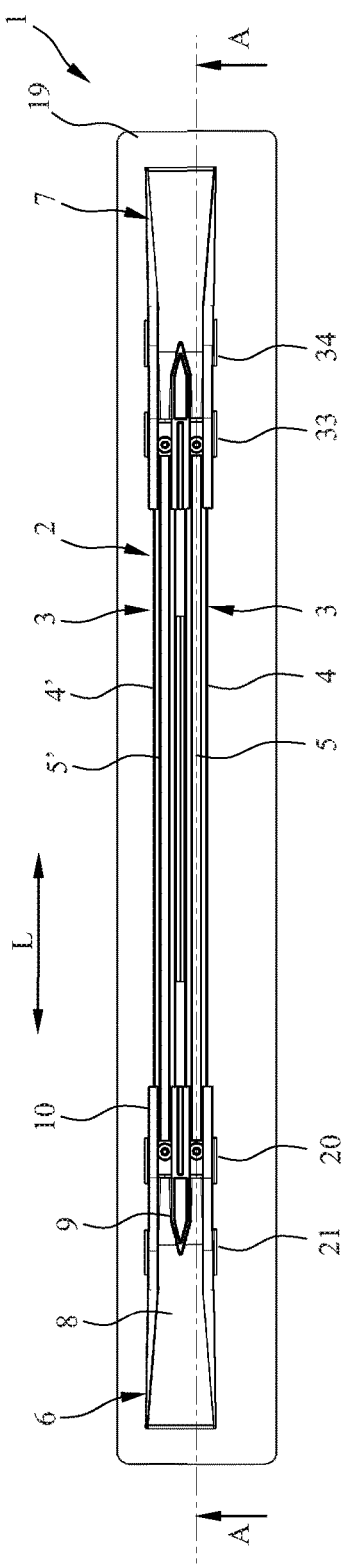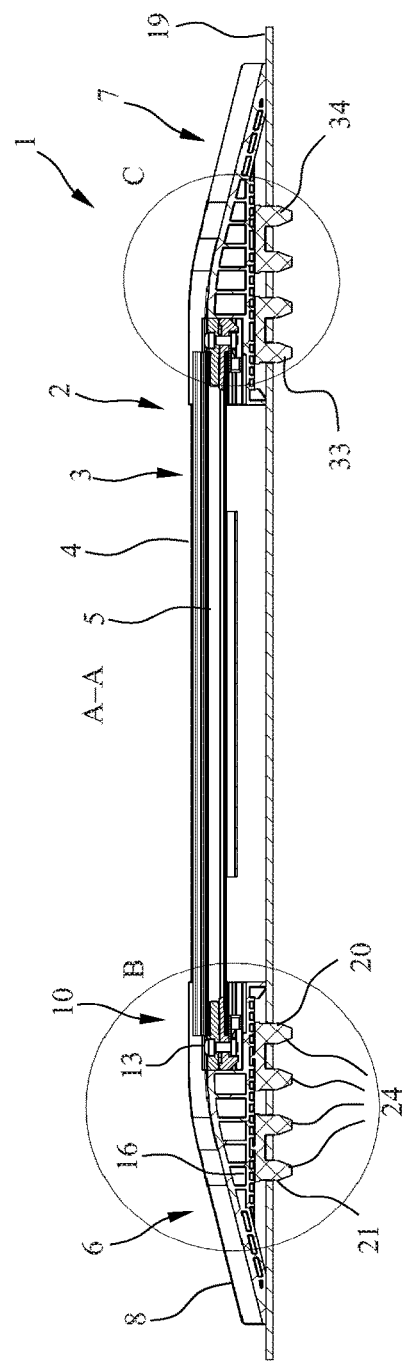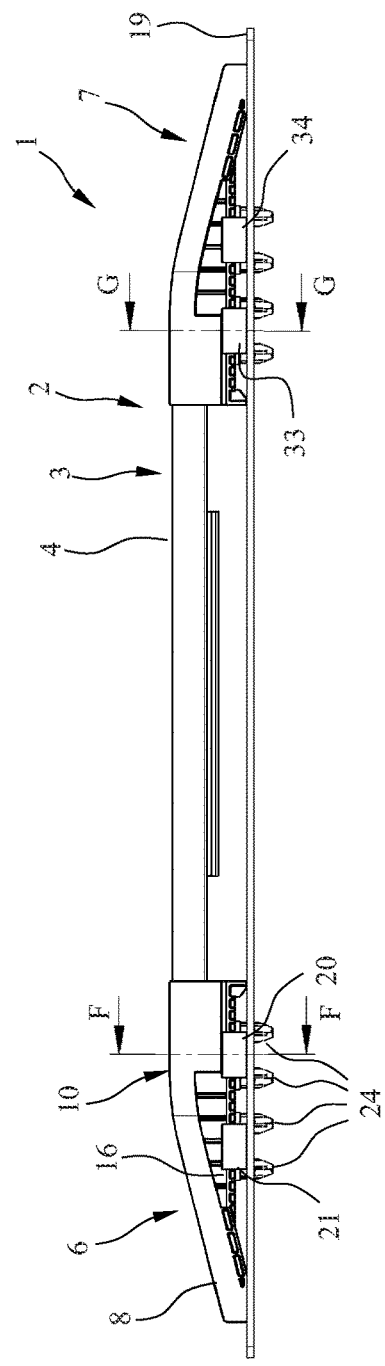
Fig. 2
Fig. 3
Fig. 4

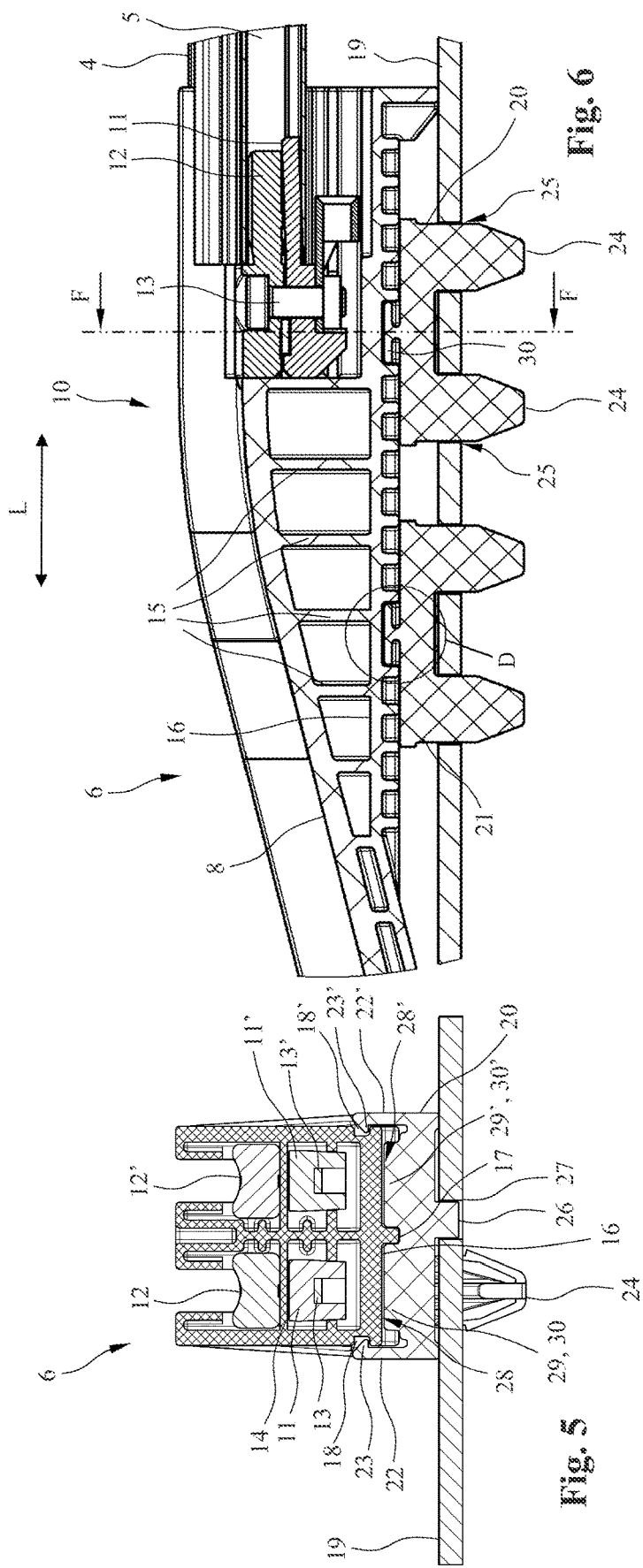
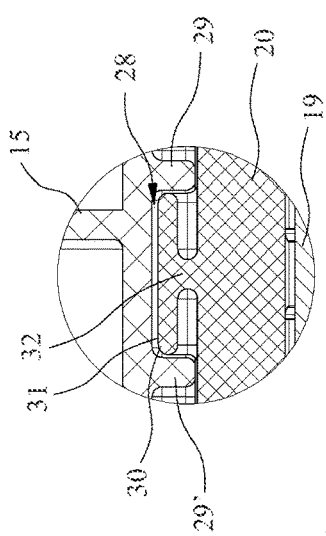

FASTENING DEVICE FOR A CONDUCTOR LINE AND CONDUCTOR LINE SYSTEM

FIELD OF THE INVENTION

The present invention relates to a fastening device for a conductor line and a conductor line system.

BACKGROUND OF THE INVENTION

DE 2 246 681 discloses a conductor line, wherein two transition pieces are disposed between two channel interfaces of the conductor line in order to compensate for a transverse misalignment of the two channel interfaces of the conductor line, which transverse misalignment occurs in the longitudinal expansion of the conductor line. To this end, one transition piece is disposed on each of the channel interfaces of the conductor line by means of a cardan joint coupler. In addition, one of the transition pieces comprises a funnel-like section into which a rod assembly disposed on the other transition piece can be moved by means of a positioning cylinder, thereby allowing a misalignment between the transition pieces to be additionally compensated for. In this device, a misalignment in the longitudinal direction, such as the type that can be caused, for example, by temperature-related expansions of the conductor lines, can at best be compensated for by means of transition pieces that are spatially disposed at a distance from each other. The disadvantage, however, is that a gap opens up between the two transition pieces as well as between the transition pieces and the adjoining channel interfaces of the conductor line, which gap does not favor passing through with conductor line sections.

JP 2016-041 552 A discloses a connecting piece for adjoining ends of the conductor lines of an electric overhead conveyor. The connecting piece firmly holds the two ends of the conductor lines together, but, against spring pressure, allows a certain degree of play in the longitudinal direction of the conductor lines.

The brochure "Safety Conductor Lines KBSL and KSL" of Fa. Paul Vahle GmbH & Co. KG discloses an enclosed conductor line that can be suspended by means of a sliding suspension that encloses the outside of the conductor line profile.

SUMMARY OF THE INVENTION

Thus, one aspect of the disclosure relates to eliminating the disadvantages referred to above and to securely hold the conductor line and preferably to compensate in a simple manner for a longitudinal expansion of a conductor line caused, for example, by temperature-related effects.

A fastening device for a conductor line and a conductor line system are disclosed. Further advanced modifications and embodiments of the invention are also disclosed.

According to the present invention, a fastening device as referred to above is characterized in that the holding element fastens the conductor line to the mounting element in such a way that movement at right angles to the longitudinal direction L of the conductor line is not possible. This ensures that the conductor line is securely fastened. A beneficial aspect of the invention provides that as an alternative or in addition to the fastening device just mentioned, the holding element fastens the conductor line to the mounting element in such a way that movement in the longitudinal direction of the conductor line is possible.

The fastening device can comprise a connecting piece for rigidly fastening it to the conductor line, on the one hand, rigidly fastening it to the holding element or for fastening it in such a way that movement in the longitudinal direction is possible. The holding element can preferably comprise fixing lugs and/or fixing recesses that engage in mating fixing recesses and/or fixing lugs on the conductor line or on the connecting piece. A weakened area in the material, especially a predetermined rupture point, can be provided in said fixing lug for easy removal of the fixing lugs.

The connecting piece can preferably be a funnel-like entry and/or exit section for conductor contacts of an electrical load that can be moved along the conductor line.

According to a useful embodiment of the invention, the holding element can comprise legs that, at right angles relative to the longitudinal direction, lie opposite each other and that enclose the conductor line and/or the connecting piece. This makes it possible to ensure that the conductor line is securely held at right angles relative to the longitudinal direction, i.e., preferably in the upward direction, and/or in a lateral direction relative to the longitudinal direction. The legs can preferably comprise stop lugs and/or connecting openings that engage in mating connecting openings and/or stop lugs of the conductor line and/or the connecting piece.

The holding element can preferably also comprise at least one stop element for connection to a counterstop element of the mounting element. Furthermore, the holding element can preferably also comprise at least one positioning element for a mating counterpositioning element of the mounting element.

According to the present invention, a conductor line system as referred to above is characterized in that the second fastening device is connected to the conductor line and/or to the mounting element in such a way that movement in the longitudinal direction L is possible. This ensures that the conductor line is securely held and preferably compensates in a simple way for a longitudinal expansion of a conductor line caused, for example, by temperature-related effects.

More specifically, the present invention makes it possible for a conductor line to be easily mounted in such a way that movement in the longitudinal direction is not possible, on the one hand, and to be mounted in such a way that movement in the longitudinal direction is possible, on the other hand. The holding elements can differ from each other simply by providing or omitting fixing lugs that engage in mating fixing recesses on the conductor line and/or the connecting piece. In addition or as an alternative thereto, some of the conductor lines and connecting pieces can comprise fixing lugs that engage in mating fixing recesses on the holding elements.

BRIEF DESCRIPTION OF THE DRAWINGS

The present invention will be described below based on detailed practical examples with reference to the accompanying drawings. The drawings show:

FIG. 2 a top view of the conductor line system shown in FIG. 1;

FIG. 3 a lateral sectional view of the conductor line system shown in FIG. 2 along the sectional line A-A;

FIG. 4 a lateral view of the conductor line system shown in FIG. 1 from the bottom right of FIG. 1;

FIG. 5 a sectional view through the conductor line system shown in FIG. 4 along the sectional line F-F;

FIG. 6 an enlarged portion B of the sectional view of the conductor line system shown in FIG. 3;

FIG. 7 a further enlarged portion D of the view shown in FIG. 6;

DETAILED DESCRIPTION OF THE INVENTION

Figure 1:
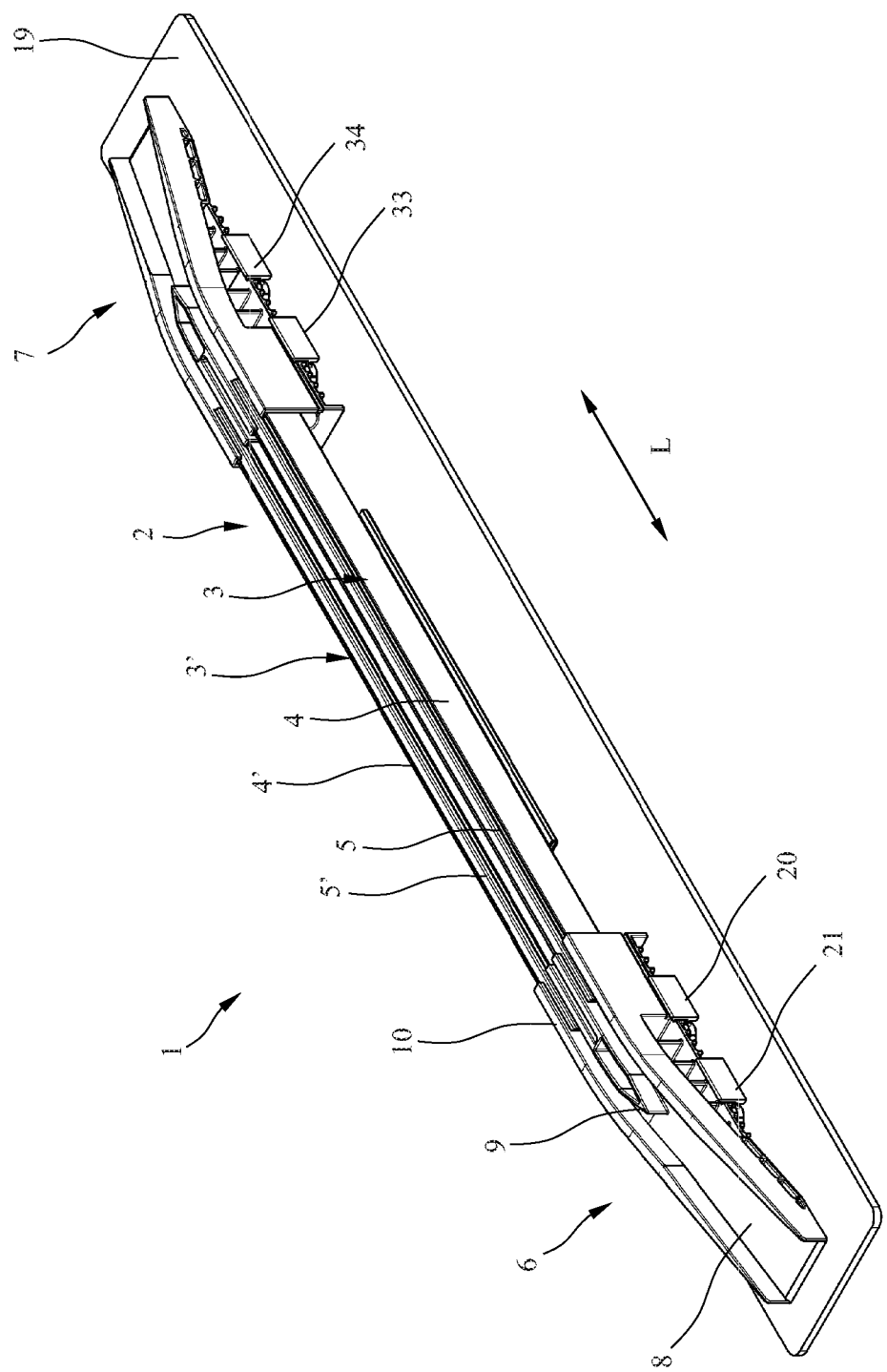
FIG. 1 a schematic three-dimensional view of a conductor line system according to the present invention.
Figure 9:
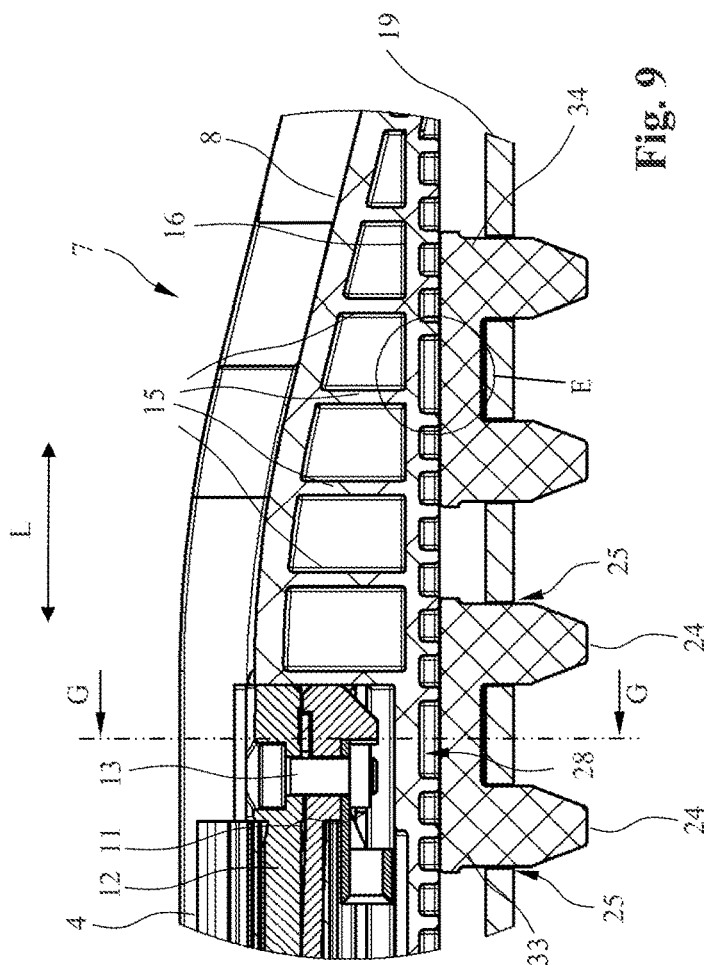
FIG. 9 an enlarged portion C of the sectional view of the conductor line system shown in FIG. 3.
Figure 8:
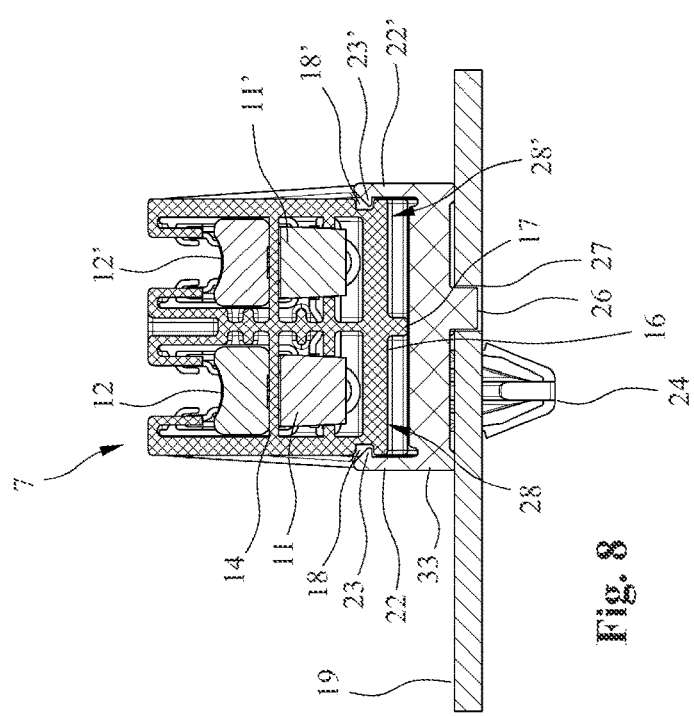
FIG. 8 a sectional view through the conductor line system shown in FIG. 4 along the sectional line G-G.
Figure 10:
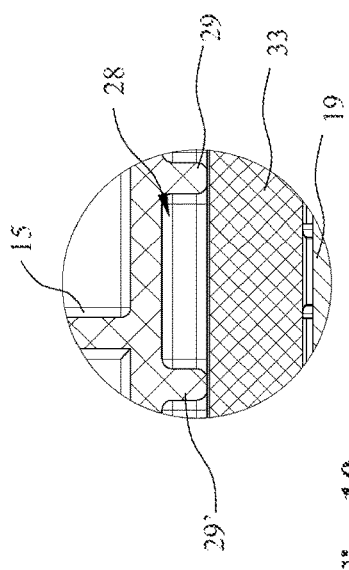
FIG. 10 a further enlarged portion E of portion C shown in FIG. 9.

FIG. 1 shows a schematic three-dimensional view of a conductor line system 1 according to the present invention, comprising a conductor line 2 known in the art that, as shown in FIGS. 1 to 4, is highly shortened in the longitudinal direction L. The conductor line 2 comprises two conductor strands 3, 3' extending parallel to each other in the longitudinal direction L, which conductor strands have upwardly open insulating profiles 4, 4', as shown in the drawings, with conductor rails 5, 5' held therein. The conductor rails 5, 5' can be contacted by conductor contacts (not shown), disposed in pairs one next to the other, of an electrical load that can move relative to the conductor line 2. The conductor rails 5, 5' are frequently mounted with the openings oriented to the side or downwardly; however, for ease of representation, the openings in the drawings are oriented upwardly.

To insert the conductor contacts into the conductor line 2, a first funnel-like entry/exit section 6 and a second funnel-like entry/exit section 7 are disposed on the left and right ends of the conductor line 2, as seen in FIG. 1, which sections, for the sake of simplifying the description, will hereinafter be referred to as the funnel-like entry section 6 and the funnel-like exit section 7. Only the funnel-like entry section 6 will therefore be described in detail below, with the statements offered also applying mutatis mutandis to the funnel-like exit section 7. In addition, components of the two funnel-shaped openings 6, 7 having identical functions are identified by identical reference characters.

The funnel-like entry section 6 has an entry ramp 8 that, as seen from above, tapers downwardly in the shape of a funnel and, as seen from the side, slopes upwardly, which entry ramp serves to accurately position the conductor contacts relative to the conductor strands 3, 3. A wedge-shaped threading aid 9 on the transition from the upwardly sloping entry ramp to the straight-line portion of the funnel-like entry section 6 ensures that the conductor contacts can be easily threaded into the conductor strand 3, 3' associated therewith.

The entry ramp 8 is adjoined by a connecting area 10 on which the conductor strands 3, 3' are rigidly connected to the funnel-like entry section 6.

As especially well illustrated in the sectional view of FIG. 3 and in detail B, which is once again shown in detail in FIG. 6, as well as in the sectional view of FIG. 5 along the sectional line F-F in FIGS. 3 and 6, the conductor strands 3, 3' are securely clamped to the funnel-like entry section 6 by means of two clamping pieces 11, 12. To this end, the lower clamping piece 11 is screwed to the upper clamping piece 12 by means of a clamping screw 13, which clamps the clamping pieces to a clamping rib 14 of the funnel-like entry section 6. Because the clamping pieces 11, 12 also enclose the conductor rails 4, 4', the conductor rails are therefore also clamped by the clamping pieces and therefore securely fastened to the funnel-like entry section 6 especially in the longitudinal direction.

The funnel-like entry section 6 comprises a plurality of vertical stabilizing ribs 15 that connect the entry ramp 8 in the vertical direction to a supporting base 16. The supporting base 16 extends substantially in the longitudinal direction L and forms a lower horizontal leg of the substantially U-shaped structure of the funnel-like entry section 6, as clearly illustrated in the cross-section of FIG. 5. Disposed on the lower surface of the supporting base 16 is a rib-like guide member 17 extending in the longitudinal direction L. Along the supporting base 16, the funnel-like entry section 6, on the outside of its lower lateral ends as seen in FIG. 5, comprises two connecting grooves 18, 18' extending in the longitudinal direction L.

To fasten the funnel-like entry section 6 to a mounting surface, in this case to a mounting element 19, two identically configured holding elements 20, 21 are provided so that only the holding element 20 shown in the cross-sectional view in FIG. 5 will be described below. This description also applies mutatis mutandis to the other holding element 21, which will not be specifically described.

The holding element 20, which is preferably made of a plastic material, has an approximately U-shaped cross-section with oppositely lying legs 22, 22' extending in the longitudinal direction L. Disposed on the free ends of the legs 22, 22' are stop lugs 23, 23', which extend in the longitudinal direction L and which engage in the lateral connecting grooves 18, 18, thereby securing the funnel-like entry section 6 to the holding element 20 at right angles to the longitudinal direction L, i.e., both in the lateral direction and in the vertical direction.

To fasten the holding element 20 to the mounting surface 19, two identically configured mounting mandrels 24 are provided, which are offset relative to each other in the longitudinal direction L and which are inserted into and engage in mating mounting openings 25 in the mounting surface 19, where they are locked in position.

To mount the holding element 20 in the correct position on the mounting surface 19, the holding element 20 comprises a positioning mandrel 26 that engages in a mating positioning opening 27 in the mounting surface 19.

The mounting openings 25 and the positioning opening 27 and thus, mutatis mutandis, the mounting mandrels 24 and the positioning mandrel 26 are preferably disposed so as to be offset in the lateral direction relative to each other so that the holding element 20 can be inserted only in one position into the mounting surface 19. To further facilitate the insertion, the mounting openings 25 and the positioning opening 27 and thus, mutatis mutandis, also the mounting mandrels 24 and the positioning mandrel 26 can preferably have different sizes in order to avoid insertion in the wrong position.

In place of the mounting mandrels 24 and the positioning mandrel 26, it is also possible to use different fastening and positioning methods that preferably allow an easy, quick and yet secure connection of the holding element 20. The fastening means can preferably be detachable in order to be able to quickly exchange the holding element 20 where appropriate.

To be able to affix the holding element 20 and thus the funnel-like entry section 6 also in the longitudinal direction L on the mounting surface 19, the funnel-like entry section 6, and especially its supporting base 16, has trough-shaped fixing recesses 28, 28' on its lower surface, which fixing recesses are preferably bounded in the longitudinal direction L by rib-like fixing members 29, 29', which extend at right angles relative to the longitudinal direction L. This allows the mating T-shaped fixing lugs 30, 30' of the holding element 20 to engage in the fixing recesses 28, 28'.

As the detail view in FIG. 7 illustrates, the fixing lug 30, in the longitudinal direction L, has a fixing surface 31 that corresponds to the longitudinal extension of the fixing recesses 28. The fixing surface 31 is fastened to the remaining portion of the holding element 20 by means of a rib-like holding member 32, which extends at right angles to the longitudinal direction L. The advantage is that in this manner a certain elasticity in the longitudinal direction L can be ensured so that, e.g., while fastening the funnel-like entry section 6 to the holding element 20, which is already disposed on the mounting surface 19, or while fastening the holding element 20, which is already connected to the funnel-like entry section 6, to the mounting surface 19, a minor misalignment in the longitudinal direction L can be compensated for. However, the fixing lugs 30, 30' can also be designed differently, for example, in the form of mandrels, transverse rib-like members or lugs that project completely from the holding element 20.

To be able to fasten the funnel-like exit section 7 to the mounting surface 19 to allow movement in the longitudinal direction L, the holding elements 33, 34 of the funnel-like exit section 7 differ from the holding element 20, 21 of the funnel-like entry section 6 in that the holding elements 33, 34 do not have any fixing lugs 30, 30'. As described above, the funnel-like exit section 7 is affixed to the mounting surface 19 in the lateral direction extending at right angles to the longitudinal direction L and in the vertical direction by means of the holding elements 33, 34, but is able to freely move in the longitudinal direction. In this manner, changes in the length of the conductor strands 3, 3' can be easily compensated for. In the current practical example, only a single mounting surface 19 is shown; however, the funnel-like entry section 6 and the funnel-like exit section 7 can also be disposed on separate mounting elements, for example, on an elevated stand, for a longer conductor line.

In the embodiment of the fixing lugs 30, 30' with the narrow rib-like holding member 32, 32' shown in the current practical example, the holding elements 33, 34 without the fixing lugs 30, 30' for the type of mounting that allows movement in the longitudinal direction can be obtained by removing the fixing lugs 30, 30' on the holding elements 20, 21 at the installation site. This can be implemented by simply cutting off the narrow rib-like holding members 32, 32' using a knife or similar tool. From the production and installation point of view, this offers the advantage that only one version of the holding elements has to be produced and be taken along to the installation site for installation of the conductor line system 1, i.e., the holding elements 20, 21 shown in FIGS. 5 to 7 with the fixing lugs 30, 30' still attached thereto.

LIST OF REFERENCE CHARACTERS

1 Conductor line system
2 Conductor line
3, 3' Conductor strands
4, 4' Insulating profile
5, 5' Conductor rails
6 Funnel-like entry section (connecting piece)
7 Funnel-like exit section (connecting piece)
8 Entry ramp
9 Threading aid
10 Connecting area
11, 11' Lower clamping piece
12, 12' Upper clamping piece
13, 13' Clamping screw
14 Clamping rib
15 Stabilizing ribs
16 Supporting base
17 Rib-like guide member
18, 18' Lateral connecting grooves
19 Mounting surface
20, 21 Holding elements, funnel-like entry section
22, 22' Legs, holding element
23, 23' Stop lugs
24 Mounting mandrels
25 Mounting openings
26 Positioning mandrel
27 Positioning opening
28, 28' Trough-shaped fixing recesses
29, 29' Rib-like fixing members
30, 30' T-shaped fixing lugs
31 Fixing surface
32, 32' Rib-like holding member
33, 34 Holding elements, funnel-like exit section
L Longitudinal direction, conductor line

The invention claimed is:

1. A fastening device for fastening a conductor line to at least one mounting element, said fastening device comprising at least one holding element connectable to the conductor line,
wherein the at least one holding element fastens the conductor line to the at least one mounting element in such a way that movement of the at least one holding element at right angles to a longitudinal direction is not possible;
wherein the fastening device comprises a connecting piece for connection to the conductor line in such a way that movement of the conductor line is not possible, on the one hand, and for connection to the at least one holding element in such a way that movement of the at least one holding element in the longitudinal direction is possible or not possible, on the other hand; and
wherein the at least one holding element comprises at least one of fixing lugs and fixing recesses that engage in corresponding at least one of mating fixing recesses and fixing lugs on the conductor line or on the connecting piece.

2. The fastening device of claim 1, wherein the at least one holding element holds the conductor line on the at least one mounting element in such a way that movement of the at least one holding element in the longitudinal direction is possible.

3. The fastening device of claim 1, wherein the fixing lugs have a weakened area for removal of the fixing lugs.

4. The fastening device of claim 1, wherein the connecting piece is a funnel-like entry/exit section for conductor contacts of an electrical load that allows movement of the electrical load along the conductor line.

5. The fastening device of claim 1, wherein the at least one holding element comprises at least one stop element for connection to a counterstop element of the at least one mounting element.

6. The fastening device of claim 1, wherein the at least one holding element comprises at least one positioning element for a mating counterpositioning element of the at least one mounting element.

7. The fastening device of claim 1, wherein the at least one holding element comprises legs that, at right angles relative to the longitudinal direction, lie opposite each other and that enclose at least one of the conductor line and the connecting piece.

8. The fastening device of claim 7, wherein the legs comprise stop lugs that engage in mating connecting openings located on at least one of the conductor line and the connecting piece.

9. A conductor line system comprising a conductor line that is fastened by a first fastening device to a first mounting element and by a second fastening device spaced apart therefrom in a longitudinal direction of the conductor line to a second mounting element, the first fastening device being connected to the conductor line and to the first mounting element in such a way that movement of the first fastening device in the longitudinal direction is not possible,
    wherein the second fastening device is connected to the conductor line and/or to the second mounting element in such a way that movement of the second fastening device in the longitudinal direction is possible, and
    wherein at least one of the first and second fastening device is the fastening device of claim 1.

10. A fastening device for fastening a conductor line to at least one mounting element, said fastening device comprising at least one holding element connectable to the conductor line, wherein the at least one holding element fastens the conductor line to the at least one mounting element in such a way that movement of the at least one holding element at right angles to a longitudinal direction is not possible,
    wherein the fastening device comprises a connecting piece for connection to the conductor line in such a way that movement of the conductor line is not possible, on the one hand, and for connection to the at least one holding element in such a way that movement of the at least one holding element in the longitudinal direction is possible or not possible, on the other hand,
    wherein the at least one holding element comprises legs that, at right angles relative to the longitudinal direction, lie opposite each other and that enclose at least one of the conductor line and the connecting piece,
    wherein the legs comprise stop lugs that engage in mating connecting openings located on at least one of the conductor line and the connecting piece or the legs comprise connecting openings that engage in mating stop lugs located on at least one of the conductor line and the connecting piece.

11. A fastening device for fastening a conductor line to at least one mounting element, said fastening device comprising at least one holding element connectable to the conductor line,
    wherein the at least one holding element fastens the conductor line to the at least one mounting element in such a way that movement of the at least one holding element at right angles to the longitudinal direction is not possible,
    wherein the fastening device comprises a connecting piece for connection to the conductor line in such a way that movement of the conductor line is not possible, on the one hand, and for connection to the at least one holding element in such a way that movement of the connecting piece in the longitudinal direction is possible or not possible, on the other hand, and
    wherein the connecting piece is a funnel-like entry/exit section for conductor contacts of an electrical load that allows movement of the electrical load along the conductor line.

* * * * *